(12) United States Patent
Ito et al.

(10) Patent No.: US 7,594,304 B2
(45) Date of Patent: Sep. 29, 2009

(54) CLAMP DEVICE FOR CONNECTION

(75) Inventors: Norio Ito, Aichi-ken (JP); Mikio Niwa, Aichi-ken (JP)

(73) Assignee: Takagi Mfg. Co., Ltd., Aichi (JP)

( * ) Notice: Subject to any disclaimer, the term of this patent is extended or adjusted under 35 U.S.C. 154(b) by 146 days.

(21) Appl. No.: 11/547,672

(22) PCT Filed: Apr. 12, 2004

(86) PCT No.: PCT/JP2004/005225

§ 371 (c)(1),
(2), (4) Date: Jun. 7, 2007

(87) PCT Pub. No.: WO2005/100842

PCT Pub. Date: Oct. 27, 2005

(65) Prior Publication Data

US 2007/0283538 A1  Dec. 13, 2007

(51) Int. Cl.
*F16L 33/08* (2006.01)
(52) U.S. Cl. ......................... 24/279; 24/274 R; 24/20 R
(58) Field of Classification Search ........................ None
See application file for complete search history.

(56) References Cited

U.S. PATENT DOCUMENTS

| 2,189,172 | A | * | 2/1940 | Hathorn | 24/274 R |
| 2,944,314 | A | * | 7/1960 | Black | 24/279 |
| 2,990,599 | A | * | 7/1961 | Gustavsson | 24/274 R |
| 4,024,609 | A | | 5/1977 | Haynes | 24/274 R |
| 4,300,270 | A | * | 11/1981 | Sauer | 24/274 R |
| 4,638,531 | A | * | 1/1987 | Ribrant | 24/274 R |
| 5,473,798 | A | | 12/1995 | Baumann et al. | 24/274 R |
| 6,845,549 | B2 | * | 1/2005 | Keller et al. | 24/274 R |
| 2003/0188402 | A1 | * | 10/2003 | Keller et al. | 24/274 R |

FOREIGN PATENT DOCUMENTS

| DE | 37 16 327 A1 | 11/1988 |
| EP | 0 586 396 B1 | 4/1992 |
| JP | 54-42130 | 3/1979 |
| JP | 55-47006 | 4/1980 |
| JP | 61-244906 | 10/1986 |
| JP | 1-176293 | 12/1989 |
| JP | 6-23822 | 3/1994 |
| JP | 7-26711 | 1/1995 |
| JP | 7-44962 | 12/1995 |
| JP | 2003-28366 | 1/2003 |
| WO | WO 92/20950 | 11/1992 |

* cited by examiner

*Primary Examiner*—Jack W. Lavinder
(74) *Attorney, Agent, or Firm*—Morgan, Lewis & Bockius LLP (57) ABSTRACT

A clamping device (1) for connection in which a housing (4) rotatably accommodates a worm screw (5) to mesh with an array of teeth portion (6) of a strap band (3). The strap band (3) is diametrically contracted upon operating the worm screw (5) to wind the strap band (3) around a connecting portion (2). One end portion of the strap band (3) in which the array of teeth portion (6) resides, is formed into a wavy and concavo-convex configuration in its width direction, thus increasing a meshing area of the array of teeth portion (6) against the worm screw (5). This makes it possible for the strap band (3) to cope with a situation in which the strap band (3) is required to tightly wind the connecting portion (2) with a high tightening force.

5 Claims, 12 Drawing Sheets

CLAMP DEVICE FOR CONNECTION

FIELD OF THE INVENTION

The invention relates to a clamping device for connection in which a worm screw is brought into mesh with an array of teeth portion defined on a strap band so as to diametrically contract it upon tightening the strap band around a connecting portion.

BACKGROUND OF THE INVENTION

This type of the clamping device has been disclosed by Japanese Utility Model Publication No. 6-23822, Japanese Laid-open Patent Application No. 61-244906 and Japanese Patent Publication No. 7-26711 (referred to as "first document", "second document" and "third document" in turn hereinafter).

In the first document, a portion in which slantwise grooves are defined to make a worm screw mesh with the grooves, is swollen in the diametrical direction to distance from a hose-forming section so as to prevent an incidental damage on the hose. This prevents a maximum surface pressure from exerting at the contact portion between a band and the hose, so as for the band not to stick into the slantwise grooves due to the action of the screw worm.

In the second document, it is taken into consideration that an increased width of gear grooves tends to tear an outer band upon tightening the band when the gear grooves are formed by means of a punching procedure. Instead of the punching procedure, a drawing and extrusion method (half-cut procedure) are used as an example of forging procedure to form the gear grooves. This enlarges a contact area in which a worm screw gets meshed with the gear grooves so as not to easily tear the band when tightened with an increased torque.

In the third document, the document discloses a bias structure as an elastic accumulation device which gives an urging force to a strap by means of multiple types of spring. With the use of these springs, the structure makes up for a tightening force by an amount reduced after the strap is tightened so as to minimize the reduced amount of the tightening force of the strap.

In the structure where the slantwise grooves are swollen as disclosed in the first document, the structure increases a bending rigidity of the band in its circumferential direction. Under the above structure, it becomes necessary to apply a larger amount of tightening force to the band so as to increase a sliding pressure of the worm screw against the slantwise grooves, thus producing a possibility to do damage on the screw worm and the slantwise grooves so as to lose the normal function of the band.

A housing in the first document seems to be secured to the band by bending a lower end portion of the housing in the manner depicted by Figures attached to the first document. For this reason, the housing is subjected to a reactionary force via the worm screw from the band upon tightening the worm screw, thus deforming the lower end portion of the housing to extend in the diametrical direction. This decreases a meshing allowance of the worm screw against the slantwise grooves, thus increasing the sliding pressure between the worm screw against the slantwise grooves so as to aggravate the above inconvenience.

A meshing allowance of the worm gear against the gear grooves in the second document is due to the valley portions of the worm gear and the linear convex portions of the outer band. The structure permits the outer band to compensate the bending rigidity by an amount which would be lost when the grooves are perforated through, while at the same time, increasing the reactionary force, to which the worm gear is subjected through the band.

For this reason, a large amount of the reactionary force increases the sliding pressure of the worm gear against the gear grooves to do damage on the gear grooves or excessively wear the valley portion of the worm gear so as to bring it out of mesh especially when tightly winding the band.

The third document shows that a strap is tightened against a rubber hose by the force of approx. 10-30 kg/cm$^2$ with the compressibility of the rubber hose as approx. 20-30%. This is effective in compensating the tightening force of the band by an amount in which the rubber hose contracts although it raises a manufacturing cost due to an increased number of component parts with a complicated structure.

Judging from the manner as depicted in FIGS. 3 and 10 of the third document, the teeth portion is seemed to be formed by means of an impression procedure. For this reason, a meshing allowance of a screw bolt against the teeth portion is due to the valley portions of the screw bolt and the teeth portion as described in the second document. This increases the sliding pressure of the screw bolt against the teeth portion to do damage on the teeth portion and the screw bolt.

Judging from the housing partly notched in the second document, the lower end portion of the housing is seemingly bent against an inner side of the strap. This produces a deforming force on the housing to disengage the screw bolt out of the teeth portion due to the larger amount of the reactionary force, to which the housing is subjected through the strap when tightly winding the strap around the connecting portion.

In any of the documents mentioned above, it is not sufficient to cope with the above inconveniences especially when tightening the strap with the increased torque.

Therefore, it is an object of the invention to overcome the above drawbacks, and provide a clamping device for connection which is capable of increasing a contact area between a worm screw and an array of teeth portion, while decreasing a sliding pressure per a unit area therebetween, thus maintaining a good meshing condition between the worm screw and the array of teeth portion for an extended period of time when tightening a strap band with an increased torque.

DISCLOSURE OF THE INVENTION

According to the invention, there is provided a clamping device for connection in which a strap band formed into an open-end annular configuration so as to be tightly wound around a connecting portion. A housing is fixed to one end portion of the strap band in its circumferential direction with a worm screw rotatably accommodated within the housing. The housing has an outer flat surface connected to another outer flat surface with a curved upper end as a roof portion, right and left sides of which has an arcuately recessed portion to form a slope surface portion as a reinforcement rib on a central portion of the outer flat surface. An array of teeth portion is arranged on the other end of the strap band so that the teeth portion comes to mesh with the worm screw within the housing, so as to tighten the strap band against the connecting portion by rotating the worm screw against the array of teeth portion. The other end portion of the strap band in which the array of teeth portion resides being formed into a wavy and concavo-convex configuration in a width direction of the strap band, so as to increase a meshing area of the array of teeth portion against the worm screw.

With the array of teeth portion formed into the wavy and concavo-convex configuration in the width direction, it is possible to increase a contact area or sliding pressure between the worm screw and the array of teeth portion. While at the same time, the array of teeth portion increases its bending rigidity to improve the physical strength in the direction in which the array of the teeth portion is subjected to the sliding pressure from the worm screw.

This makes it possible to mesh the array of teeth portion of high bending rigidity with the worm screw through an enlarged contact area, thus spreading the sliding pressure of the worm screw against the array of teeth portion so as to decrease the sliding pressure per a unit area. As a result, it becomes possible to maintain a good meshing condition between the worm screw and the array of teeth portion for an extended period of time without doing damage on the worm screw and the teeth portion upon tightly meshing the worm screw with the array of the teeth portion.

Since the housing has an outer flat surface connected to another outer flat surface with a curved upper end as a roof portion, right and left sides of which have an arcuately recessed portion to form a slope surface portion as a reinforcement rib, it is possible to reduce the thickness of the housing without sacrificing whole the necessary rigidity so as to contribute to saving the material cost.

With the improved bending rigidity and the enlarged contact area between the worm screw and the teeth portion, it is possible for the array of the teeth portion to resist against an increased sliding pressure transmitted from the worm screw so as to cope with the situation in which the worm screw is tightly meshed with the array of the teeth portion. This is inexpensively done by only providing the wavy and concavo-convex configuration on the strap band on which the array of teeth portion is defined.

According to another aspect of the invention, the strap band is made of an elastic material, and having a plurality of segments raised up intermittently in the circumferential direction. Each end of the segments is oriented opposite to a direction in which the strap band slides over the connecting portion upon tightening the strap band to make it wind around the connecting portion. With each end of the segments oriented opposite to the direction in which the strap band slides over the connecting portion, it is possible to prevent the segments from sticking against an outer surface of the connecting portion.

In the case in which the strap band is tightened around the connecting portion through a rubber hose, the tightened rubber hose weakens its restitutive force and lessens the tightening force against the connecting portion after tightening the strap band because the rubber hose has an elastic aftereffect due to its viscoelastic property.

Due to the reason that each end of the segments is oriented opposite to the direction in which the strap band slides over the connecting portion, it is possible for the segments to push against the rubber hose by an amount in which the rubber hose is viscoelastically contracted so as to compensate the tightening force lost in the strap band. This is particularly advantageous when the strap band substantially loses its tightening force against the connecting portion with a higher compressibility ratio observed on the rubber hose upon tightly winding the strap band around the connecting portion.

According to another aspect of the invention, the worm screw is formed by means of a rolling procedure, and the housing has an enveloping portion to surround the array of teeth portion. The enveloping portion is ironed out to reduce a thickness of the enveloping portion.

The enveloping portion is differentiated in thickness than other portion of the housing so as to improve the bending rigidity, in addition the worm screw being rolled to produce a high bending rigidity.

For this reason, it is possible to minimize the tendency in which the worm screw disengages out of the array of teeth portion with the housing retained as the original shape when the housing is subjected to a larger reactionary force through the worm screw. From this point of view, it is possible to maintain a good meshing condition between the worm screw and the array of teeth portion for an extended period of time.

According to another aspect of the invention, the housing has a streak of convex reinforcement on a flat surface provided with the housing. This makes it possible to reduce the thickness of the housing without sacrificing the necessary rigidity so as to contribute to saving the material cost as mentioned above.

According to another aspect of the invention, the array of teeth portion consists of narrow slits defined on the strap band. Due to the array of teeth portion being narrow slits, it is possible to manufacture the array of teeth portion with a combination of punching and bending procedures, thus making the manufacturing the teeth portion advantageously in terms of cost.

According to another aspect of the invention, the worm screw has a screw pitch surface defined into a hyperboloidal configuration so as to increase a meshing area against the array of teeth portion. This substantially spreads the sliding pressure of the worm screw against the array of teeth portion to decrease the sliding pressure per a unit area. For this reason, it is possible to maintain a good meshing condition between the worm screw and the array of teeth portion, and well-suited to a clamping device which requires a larger tightening force applied to the connecting portion.

BRIEF DESCRIPTION OF THE DRAWINGS

Preferred forms of the present invention are illustrated in the accompanying drawings in which.

DETAILED DESCRIPTION OF PREFERRED EMBODIMENTS OF THE INVENTION

First Embodiment of the Invention

In the following description of the depicted embodiments, the same reference numerals are used for features of the same type.

Figure 1:
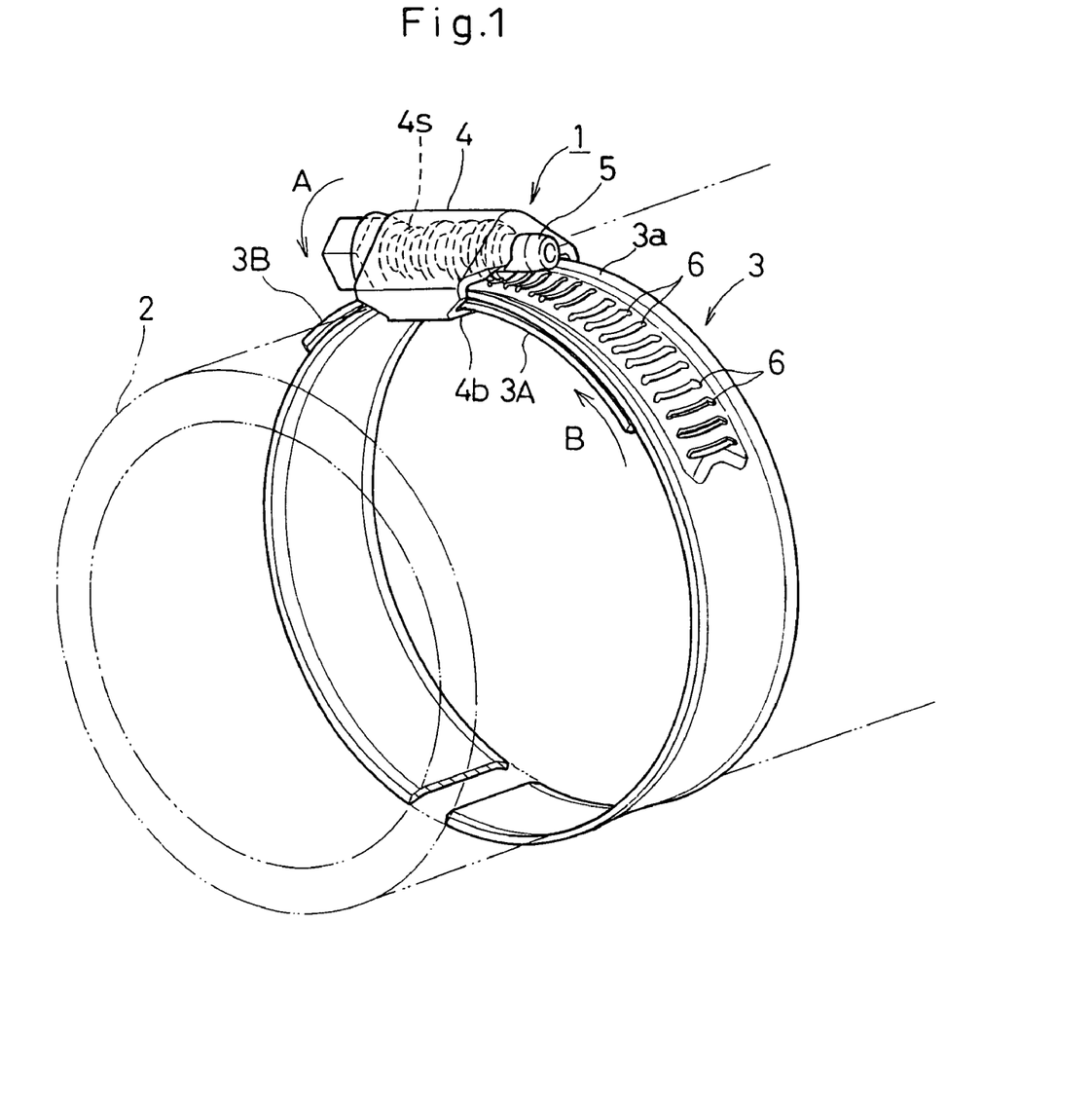
FIG. 1 is a perspective view of a clamping device for connection according to a first embodiment of the invention.
Figure 2:
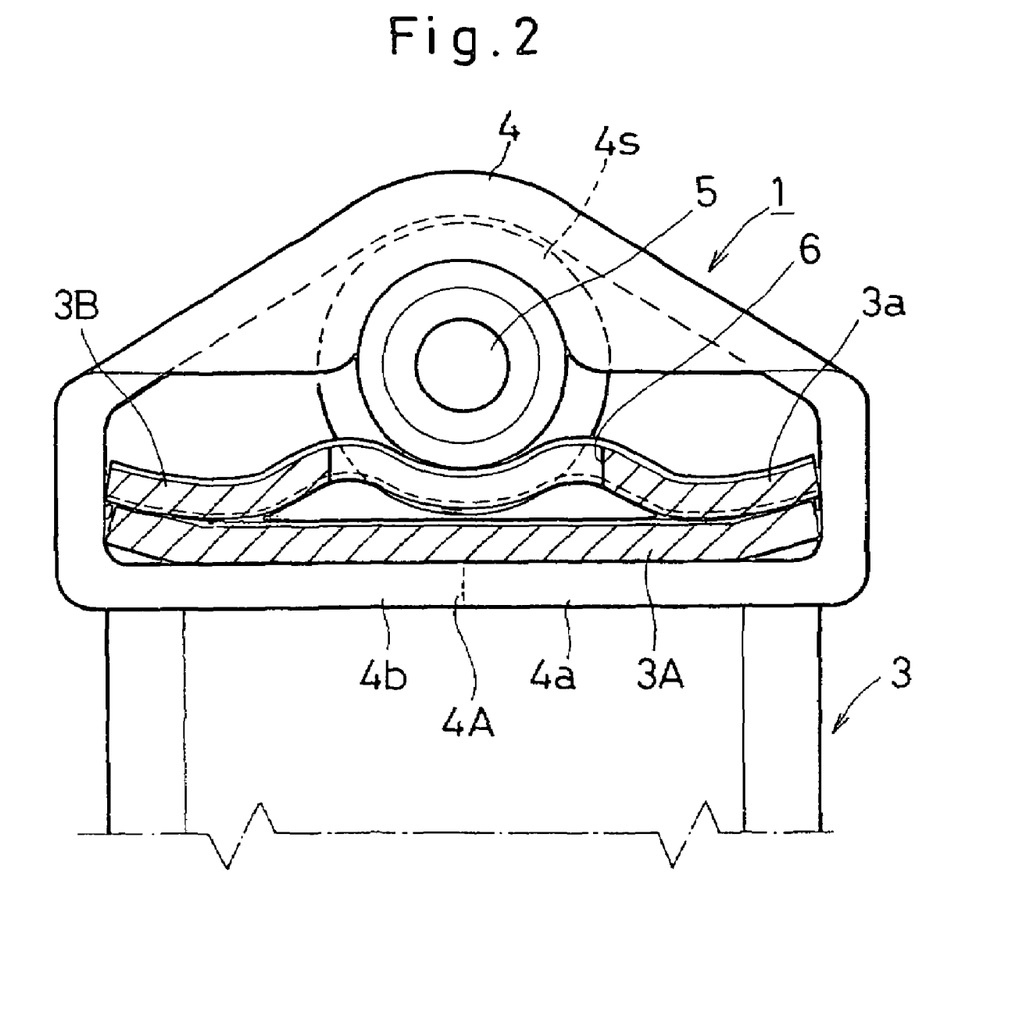
FIG. 2 is an enlarged latitudinal cross sectional view of a housing into which a worm screw is accommodated.
Figure 3:
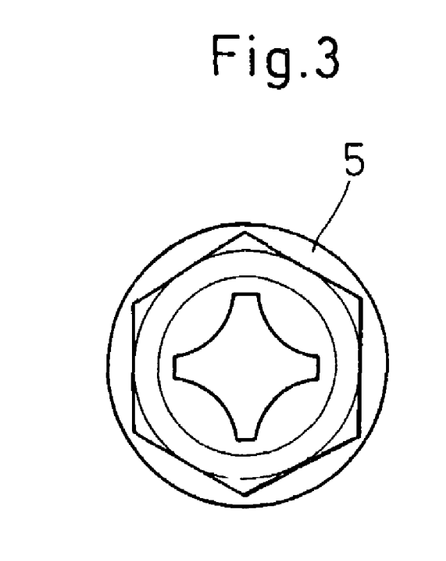
FIG. 3 is a side elevational view of the worm screw.

Referring to FIGS. 1-5 which show a clamping device 1 according to a first embodiment of the invention, the clamping device 1 discretely has a housing 4 and a strap band 3 which is provided to be tightly wound around a connecting portion 2 as shown in FIG. 1. The strap band 3 is formed with an elastic material such as stainless steel (e.g., SUS304) to have open-end portions with a predetermined width. The housing 4 is formed into a cylindrical configuration by means of a pressing procedure as shown in FIG. 2. A lower side of the housing 4 has connection lugs 4a, 4b extended as enveloping portions with the respective ends of the connection lugs 4a, 4b butted each other. A worm screw 5 is formed by means of a rolling procedure, and rotatably accommodated into the housing 4 along a circumferential direction of the strap band 3 (referred to FIG. 3).

One end portion 3A of the strap band 3 is surrounded by the connection lugs 4a, 4b, butted ends 4A of which are bonded by means of TIG welding procedure or the like. One end portion 3A of the strap band 3 is secured to the connection lugs 4a, 4b by means of a spot welding, projection welding or the like. The other end portion 3B of the strap band 3 is placed in the housing 4 to overlap with the one end portion 3A of the strap band 3.

The strap band 3 has an arcuate portion 3a which defines a plurality of slit teeth portion 6 at regular intervals as an array of teeth portion in the circumferential direction. As shown in FIG. 2, the arcuate portion 3a in which the slit teeth portion 6 resides, is formed into a wavy and concavo-convex configuration in the width direction.

Figure 4:
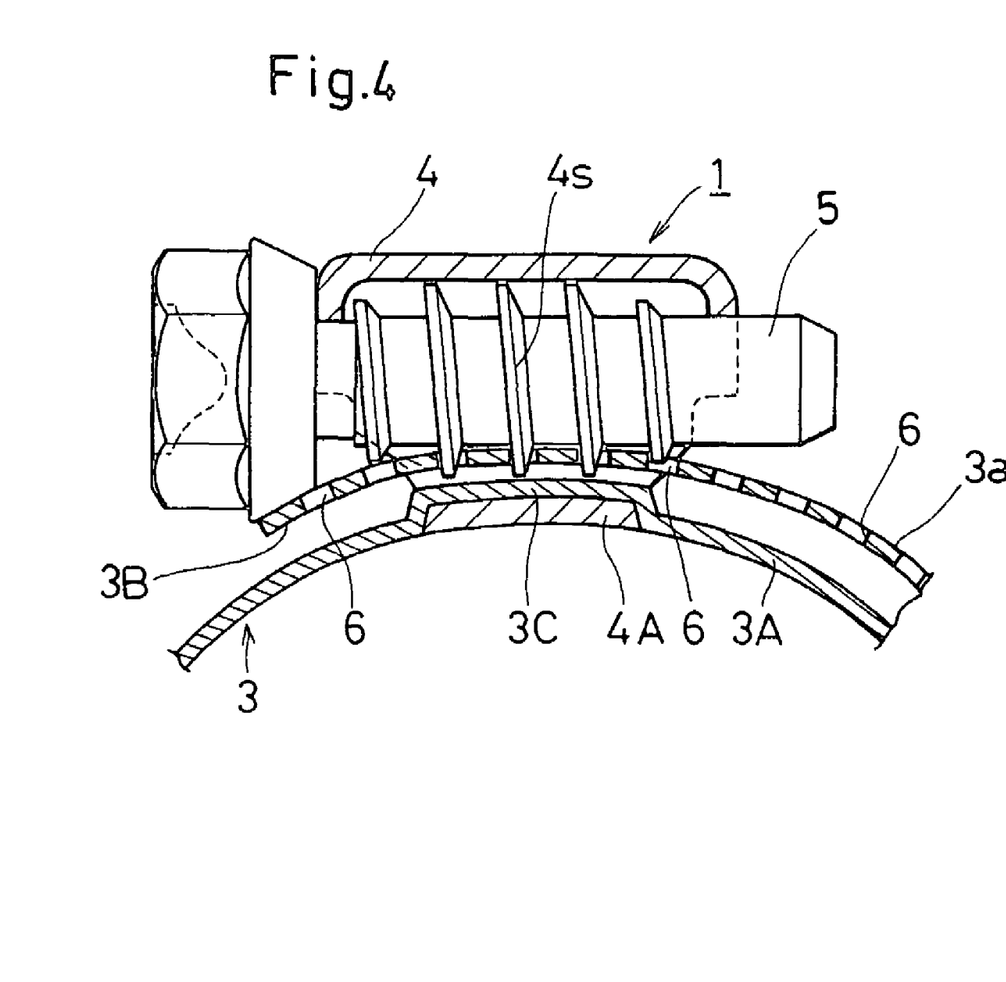
FIG. 4 is an enlarged longitudinal cross sectional view of the housing into which the worm screw is accommodated.

In this instance, the worm screw 5 has ridge portions 4s at a predetermined lead pitch as shown in FIG. 4. The worm screw 5 brings the ridge portions 4s into mesh with the slit teeth portion 6. The one end portion 3A of the strap band 3 has a bulged portion 3C swollen in the diametrical direction in order to retain the butted ends 4A of the connection lugs 4a, 4b inside the bulged portion 3C. This makes the butted ends 4A substantially in flush with the one end portion 3A of the strap band 3 as shown in FIG. 4.

Figure 5:
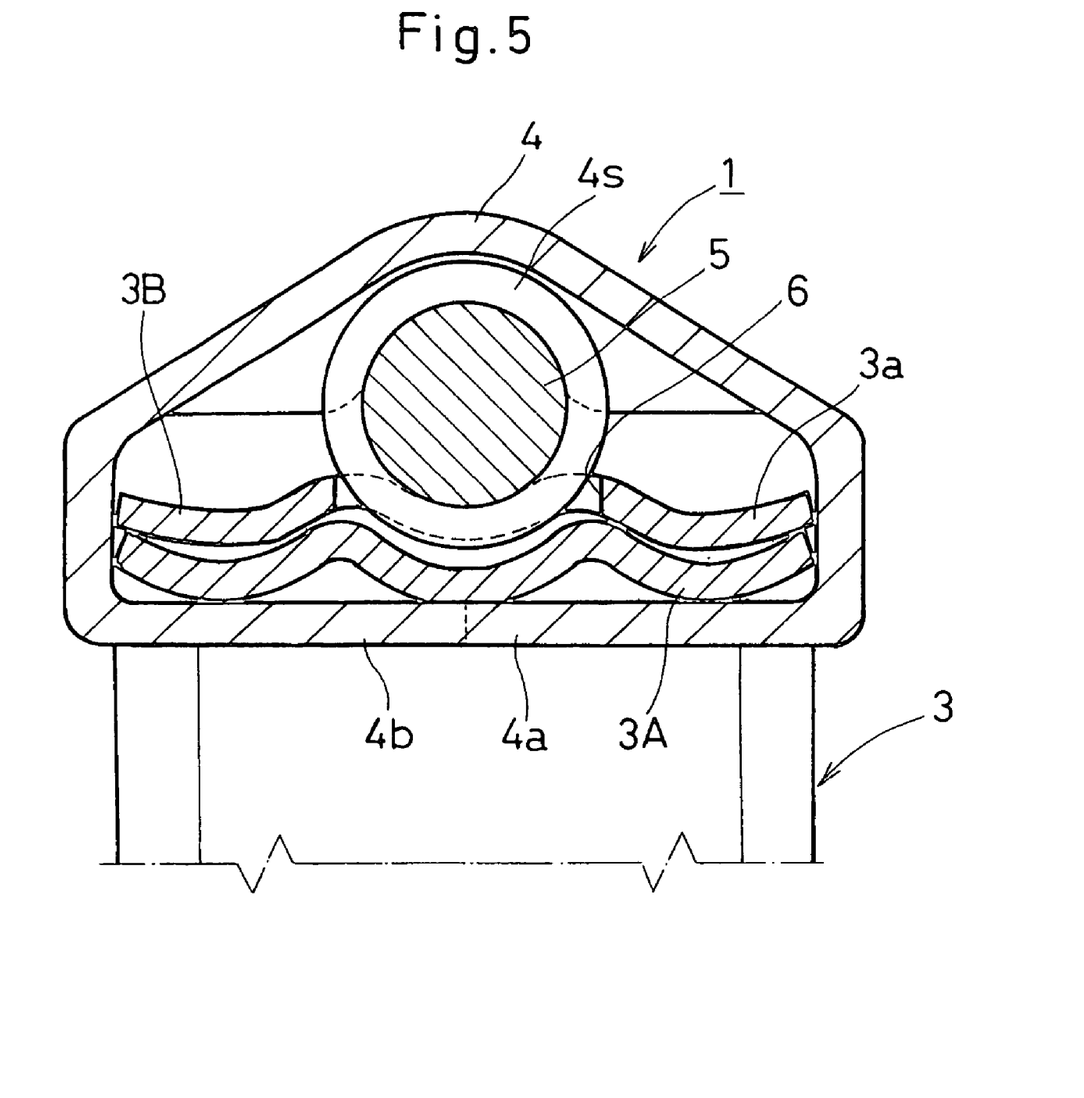
FIG. 5 is an enlarged latitudinal cross sectional view of the housing into which a strap band is accommodated.

The one end portion 3A of the strap band 3 may be shaped into wavy or arcuate form in the width direction in order to support the slit teeth portion 6 as shown in FIG. 5. With the slit teeth portion 6 supported by the one end portion 3A of the strap band 3, it is possible to maintain a good meshing condition of the worm screw 5 against the slit teeth portion 6 without disengaging the worm screw 5 from the slit teeth portion 6 upon operating the worm screw 5 with higher torque in order to tightly wind the strap band 3 around the connecting portion 2.

With the structure thus described, as shown at an arrow A in FIG. 1, the worm screw 5 is operated to slide the ridge portions 4s along an inner periphery of the slit teeth portion 6. Due to the rotation of the worm screw 5, the arcuate portion 3a is pulled through the slit teeth portion 6 to wind the strap band 3 around the connecting portion 2 with a predetermined tightening force as shown at an arrow B in FIG. 1.

With the slit teeth portion 6 formed into the wavy and concavo-convex configuration in the width direction, it is possible to increase a contact area or sliding pressure between the worm screw 5 and the slit teeth portion 6. While at the same time, the slit teeth portion 6 increases its bending rigidity to improve the physical strength in the direction in which the slit teeth portion 6 is subjected to the sliding pressure from the worm screw 5.

This makes it possible to mesh the slit teeth portion 6 of high bending rigidity with the worm screw 5 through an enlarged contact area, thus spreading the sliding pressure of the worm screw 5 against the slit teeth portion 6 so as to decrease the sliding pressure per a unit area. As a result, it becomes possible to maintain a good meshing condition between the worm screw 5 and the slit teeth portion 6 for an extended period of time without doing damage on the worm screw 5 and the slit teeth portion 6 especially when tightly meshing the worm screw 5 with the slit teeth portion 6.

With the improved bending rigidity and the enlarged contact area between the worm screw 5 and the slit teeth portion 6, it is possible for the slit teeth portion 6 to resist against an increased sliding pressure transmitted from the worm screw 5 so as to cope with the situation in which the worm screw 5 is tightly meshed with the slit teeth portion 6.

As the case in which a larger amount of tightening force is required for the connecting portion 2, an example is taken when connecting an intercooler to an intake pipe in an internal combustion engine equipped with a supercharger or turbocharger (each not shown). The intercooler is provided to cool a compressed air in order to increase the pneumatic stowing ratio. The turbocharger feeds the compressed air to an intake port (not shown) through the intercooler and the intake pipe.

The structure is such that a larger amount of air pressure is applied to the connecting portion between the intercooler and the intake pipe. This requires the strap band to apply a larger tightening force substantially equivalent to the pressure of the compressed air.

Figure 6:
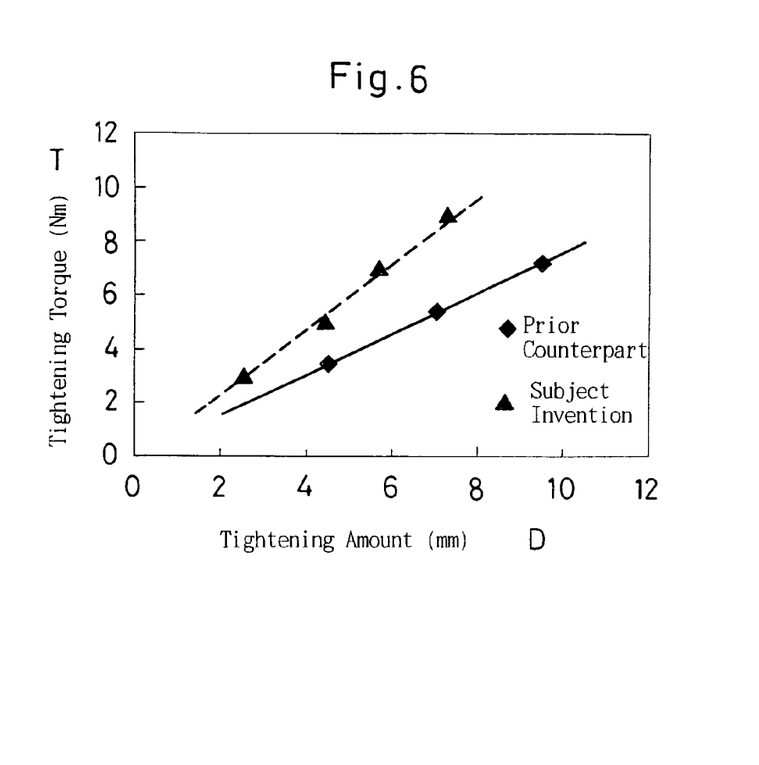
FIG. 6 is a graphical representation showing a relationship between a tightening amount of the worm screw and a tightening torque applied to the worm screw.

FIG. 6 shows a graphical representation depicting a relationship between a tightening amount D (mm) of the worm screw 5 and a tightening torque T (Nm) of the worm screw 5. In the present invention, the ratio ($\Delta T/\Delta D$) of the tightening torque T to the tightening amount D is greater than that of a prior counterpart as understood by comparing diamond legends (prior counterpart) and triangular legends (subject invention) in FIG. 6. This makes it possible to quickly attain a sufficient tightening torque T with a relatively small tightening amount D.

Figure 7:
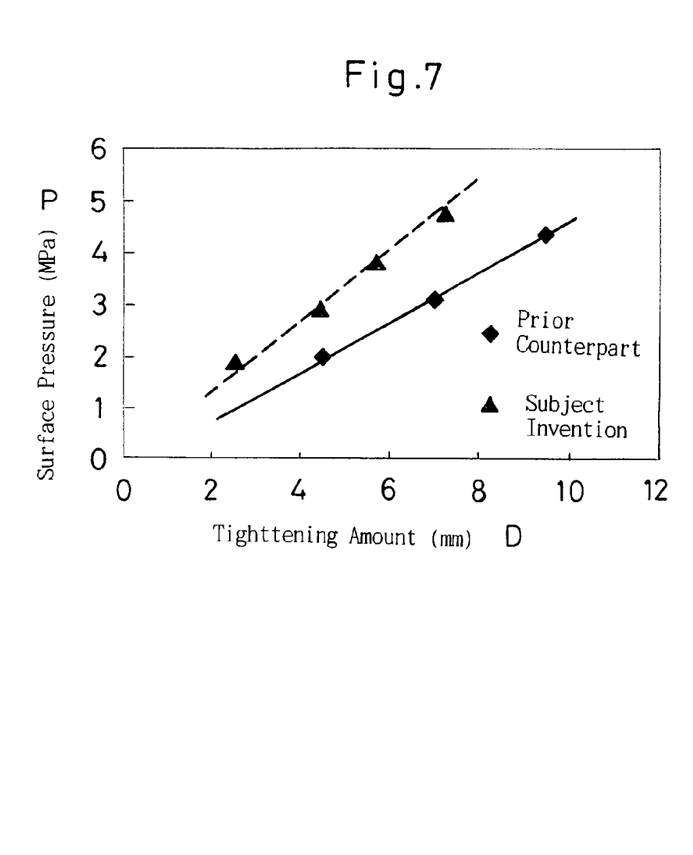
FIG. 7 is a graphical representation showing a relationship between the tightening amount of the worm screw and a surface pressure exerting at a connecting portion.

FIG. 7 is a graphical representation showing a relationship between a tightening amount D (mm) of the worm screw 5 and a surface pressure P (MPa) exerting against the connecting portion 2.

In the present invention, the ratio ($\Delta P/\Delta D$) of the surface pressure P to the tightening amount D is greater than that of the prior counterpart as understood by comparing the diamond legends (prior counterpart) and the triangular legends (subject invention) in FIG. 7. This makes it possible to quickly achieve a sufficient surface pressure P with a relatively small tightening amount D.

Since the sufficient tightening torque T and surface pressure P are achieved with a relatively small tightening amount D, it is possible to attach the strap band 3 to the connecting portion 2 for a short period of time so as to improve the working efficiency. It is to be noted that the worm screw 5 and the slit teeth portion 6 were lubricated before obtaining the graphical representations in FIGS. 6 and 7.

Figure 8:
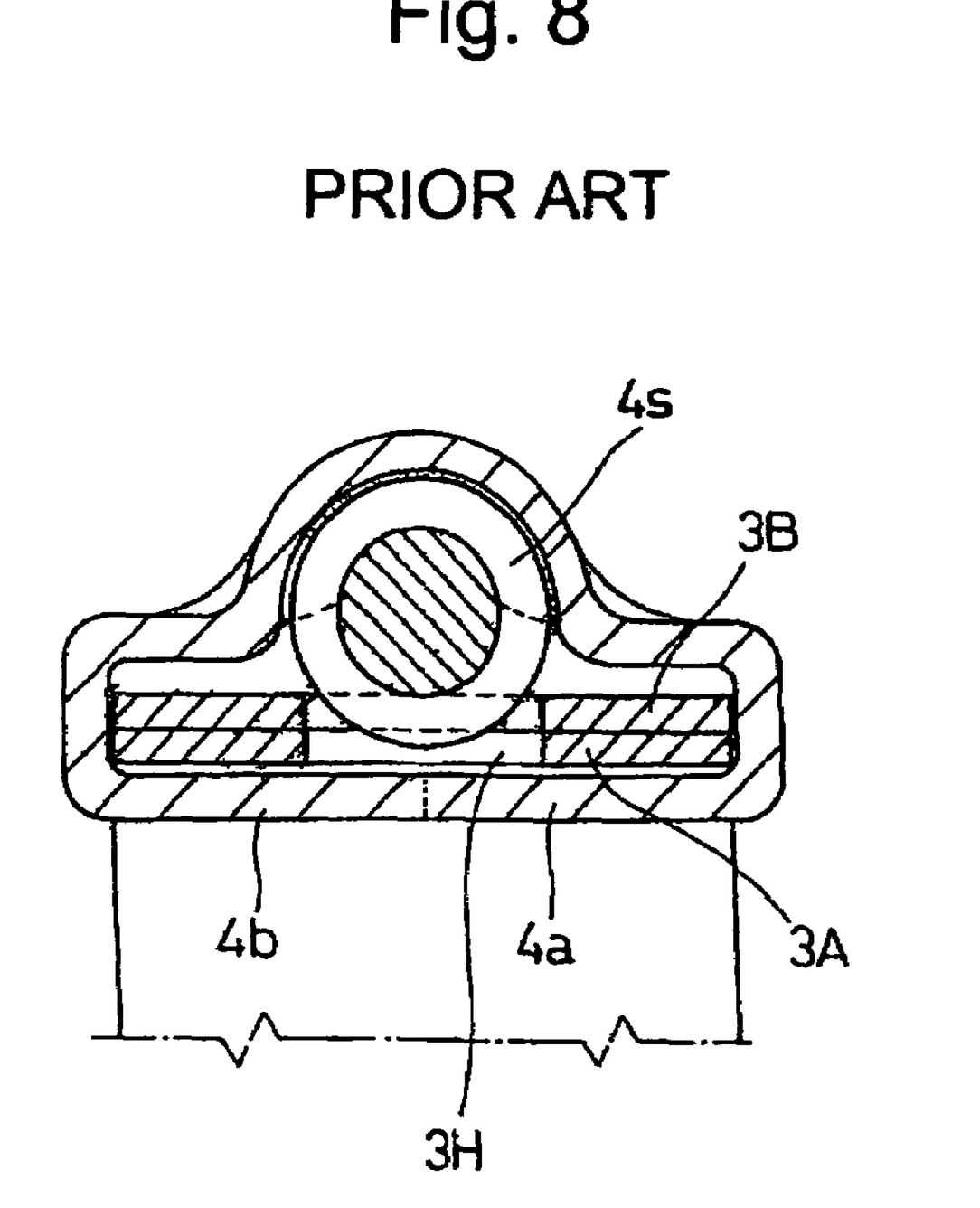
FIG. 8 is an enlarged latitudinal cross sectional view of a prior clamping device.

In the prior counterpart as shown in FIG. 8, it is necessary to provide an opening portion 3H on the one end portion 3A of the strap band 3 so that the ridge portion 4s of the worm screw 5 can rest within the opening portion 3H. The strap band 3 has a possibility of partly losing a physical strength due to the opening portion 3H provided thereon.

Contrary to the prior counterpart, with the slit teeth portion 6 formed into the wavy and concavo-convex configuration, it is possible in the subject invention for the strap band 3 to eliminate the necessity of providing any means corresponding to the opening portion 3H, thus enabling the strap band 3 to insure an appropriate physical strength.

Second Embodiment of the Invention

Figure 9:
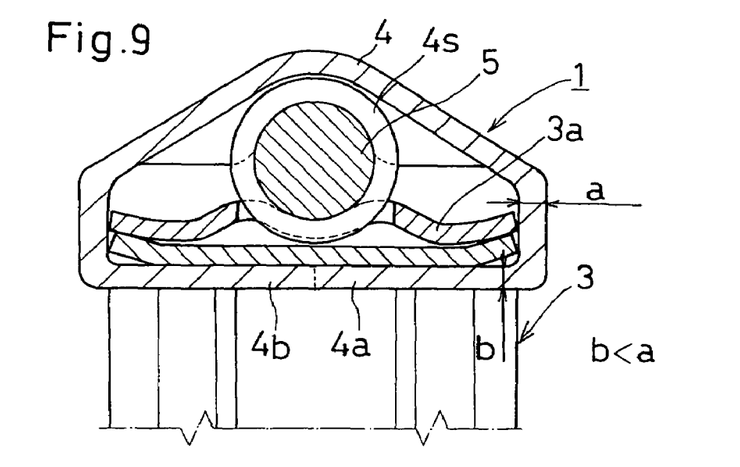
FIG. 9 is an enlarged latitudinal cross sectional view of the housing according to a second embodiment of the invention.

FIG. 9 shows a second embodiment of the invention in which the connection lugs 4a, 4b are ironed out to reduce their thickness by means of a forging procedure. The connection lugs 4a, 4b are reduced at their thickness while insuring the necessary bending and torsional rigidity for the connection lugs 4a, 4b. A relationship (b<a) is insured between a thickness (a) of the connection lugs 4a, 4b and a thickness (b) of an elevational side of the housing 4. This makes it possible to advantageously save the material cost while insuring the necessary physical strength for the connection lugs 4a, 4b.

With the thickness of the connection lugs 4a, 4b thus reduced, it is also possible to regulate an advancement of the connection lugs 4a, 4b in their thickness direction. This makes it possible to make the connection lugs 4a, 4b substantially in flush with an inner surface of the strap band 3 even if the bulged degree of the bulged portion 3C is limited to a certain extent. As a result, this enables the strap band 3 to generally maintain a uniform distribution of the surface pressure exerting against the connecting portion 2.

Third Embodiment of the Invention

Figure 10:
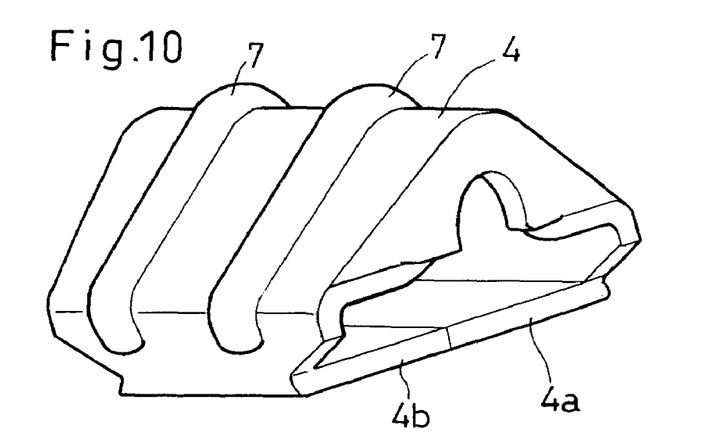
FIG. 10 is a perspective view of the housing according to a third embodiment of the invention.

FIG. 10 shows a third embodiment of the invention in which streaks of convex portion 7 are provided on an outer flat surface of the housing 4 as reinforcement ribs. With the streaks of convex portions 7 provided on the housing 4, it is possible to reduce a thickness of the housing 4 so as to save the material cost while insuring necessary bending and torsional rigidity for the housing 4.

Fourth Embodiment of the Invention

Figure 11:
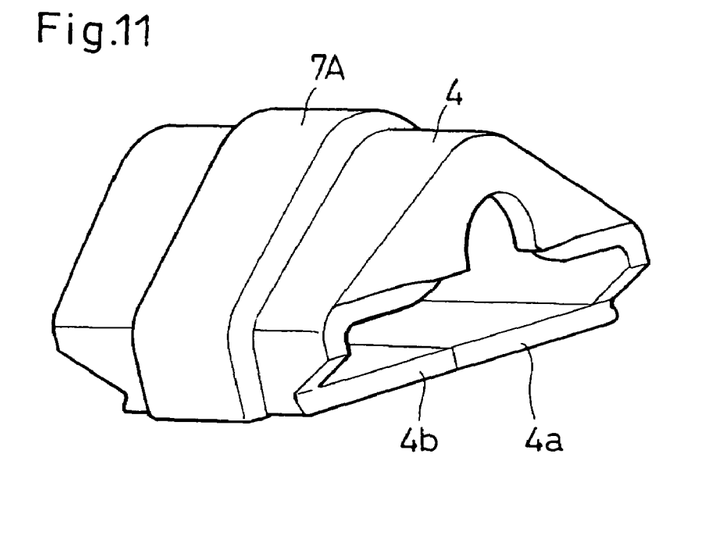
FIG. 11 is a perspective view of the housing according to a fourth embodiment of the invention.

FIG. 11 shows a fourth embodiment of the invention in which a wider web-like streak of convex portion 7A is provided as a reinforcement rib on a central portion of the outer flat surface of the housing 4.

Fifth Embodiment of the Invention

Figure 12:
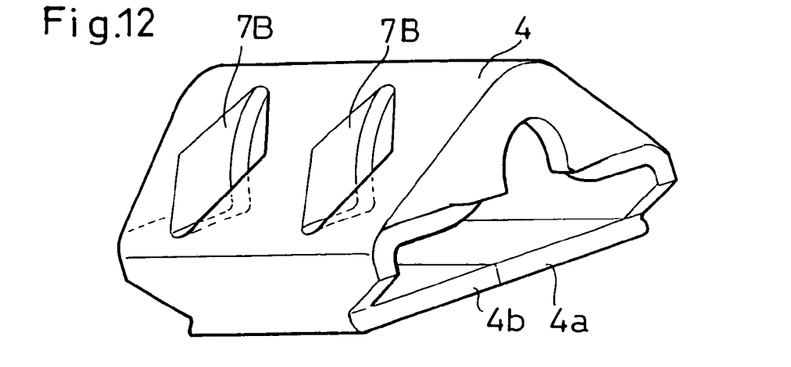
FIG. 12 is a perspective view of the housing according to a fifth embodiment of the invention.

FIG. 12 shows a fifth embodiment of the invention in which concave portions 7B are provided on right and left sides of the outer flat surface of the housing 4.

Sixth Embodiment of the Invention

Figure 13:
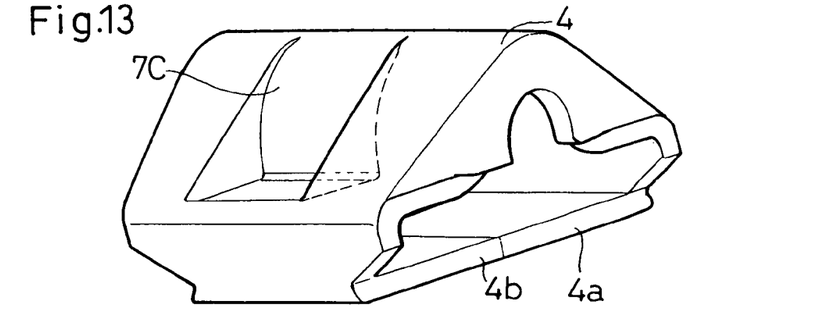
FIG. 13 is a perspective view of the housing according to a sixth embodiment of the invention.

FIG. 13 shows a sixth embodiment of the invention in which a concave portion 7C is provided on the central portion of the outer flat surface of the housing 4 in order to achieve the same advantage as insured by the fifth embodiment of the invention.

Seventh Embodiment of the Invention

Figure 14:
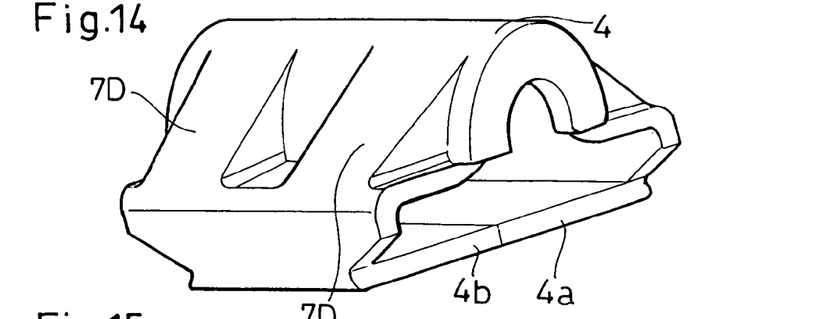
FIG. 14 is a perspective view of the housing according to a seventh embodiment of the invention.

FIG. 14 shows a seventh embodiment of the invention in which convex portions 7D are provided as a reinforcement rib in the shape of a triangular block on right and left sides of the outer flat surface of the housing 4.

Eighth Embodiment of the Invention

Figure 15:
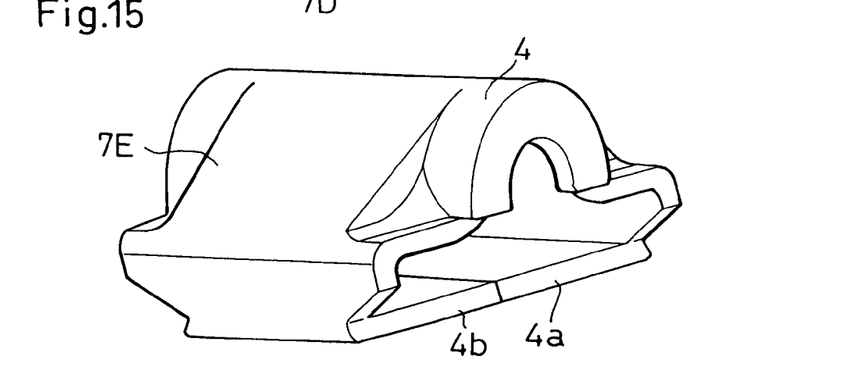
FIG. 15 is a perspective view of the housing according to an eighth embodiment of the invention.

FIG. 15 shows an eighth embodiment of the invention in which the outer flat surface of the housing 4 serves as a roof portion, right and left sides of which have an arcuately recessed portion to form a slope surface portion 7E as a reinforcement rib on a central portion of the outer flat surface.

Ninth Embodiment of the Invention

Figure 16:
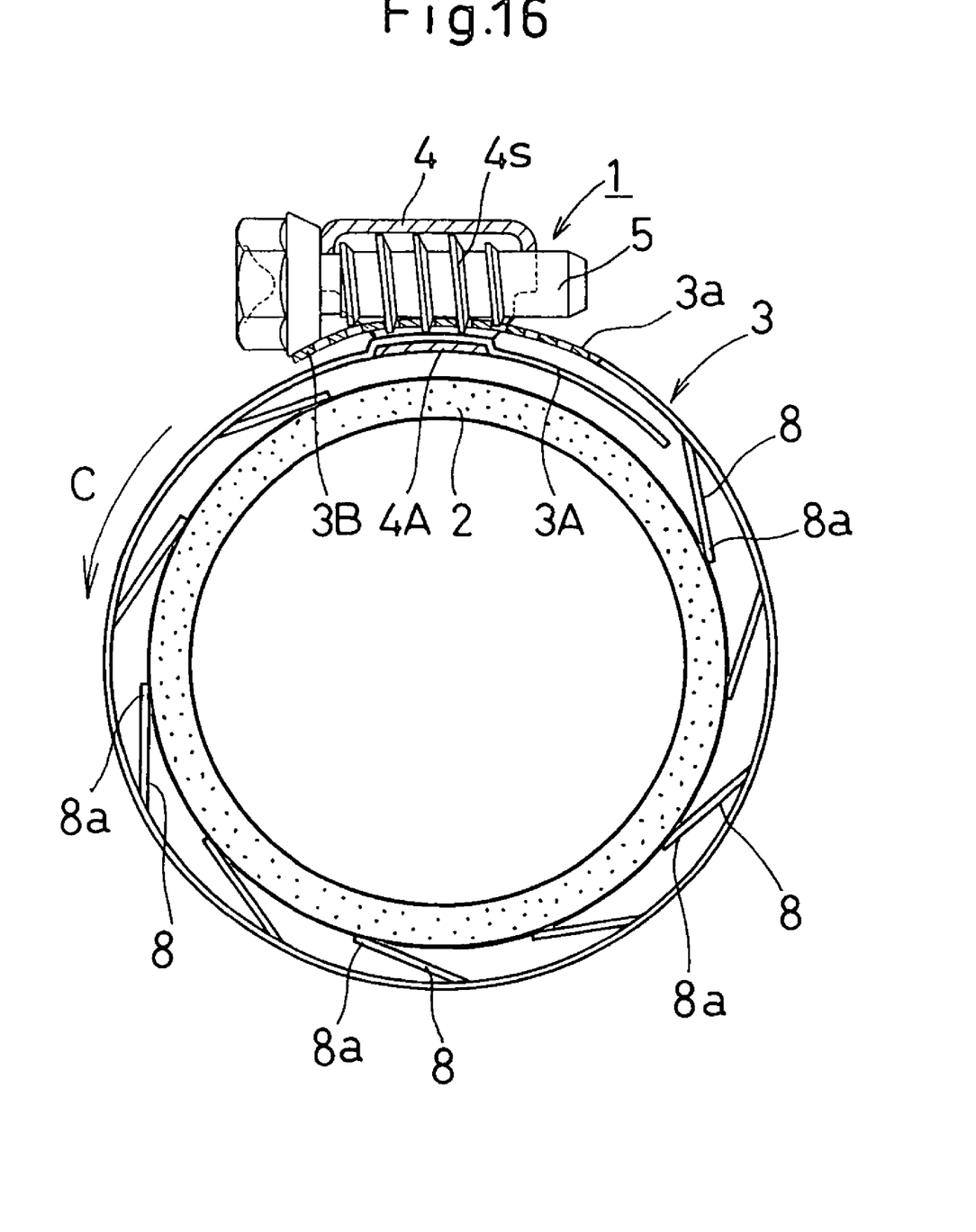
FIG. 16 is a latitudinal cross sectional view of the clamping device for connection according to a ninth embodiment of the invention.

FIG. 16 shows a ninth embodiment of the invention in which there are a plurality of segments 8 raised up intermittently on the strap band 3 in the circumferential direction except for a portion in which the arcuate portion 3a resides. Each end of the segments 8 elastically engages with an outer surface of the connecting portion 2, and oriented opposite to a direction C in which the strap band 3 slides over the connecting portion 2 upon tightening the strap band 3 to make it wind around the connecting portion 2.

With each end of the segments 8 oriented opposite to the direction C in which the strap band 3 slides over the connecting portion 2, it is possible to prevent the segments 8 from sticking against an outer surface of the connecting portion 2.

In the case in which the strap band 3 is tightened around the connecting portion 2 through a rubber hose (not shown), the tightened rubber hose weakens its restitutive force and lessens the tightening force against the connecting portion 2 after tightening the strap band 3 because the rubber hose has an elastic aftereffect due to its viscoelastic property.

By way of illustration, if the strap band 3 is tightened around the rubber hose with the magnitude of 40 kg/cm$^2$, a compressibility ratio observed on the rubber hose becomes approx. 30%. After tightening the strap band 3 around the rubber hose, it is found that the tightening force reduces to 30 kg/cm$^2$.

Due to the reason that each end of the segments 8 is oriented opposite to the direction C in which the strap band 3 slides over the connecting portion 2, it is possible for the segments 8 to push against the rubber hose by an amount in which the rubber hose is viscoelastically contracted so as to compensate for the tightening force lost in the strap band 3.

As is the case with connecting an inter cooler and an intake pipe, this is particularly advantageous when the strap band 3 substantially loses its tightening force against the connecting portion 2 with a higher compressibility ratio observed on the rubber hose upon tightly winding the strap band 3 around the connecting portion 2.

Figure 17:
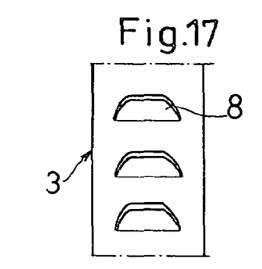
FIGS. 17-34 are schematic views showing examples of segment raised up intermittently on the strap band.
Figure 18:
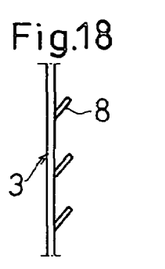
Figure 19:
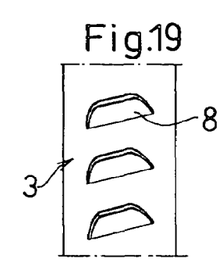
Figure 20:
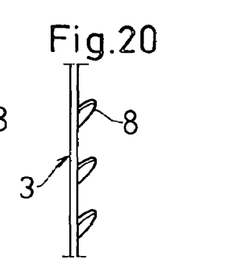
Figure 21:
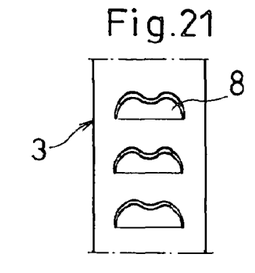
Figure 22:
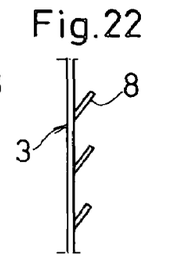
Figure 23:
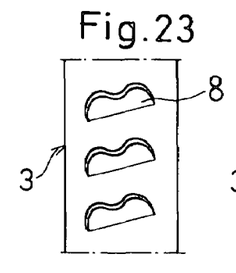
Figure 24:
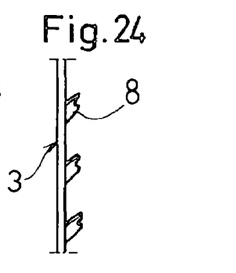
Figure 25:
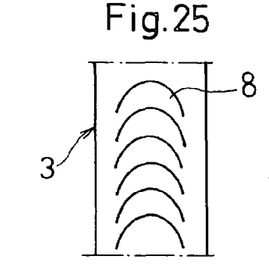
Figure 26:
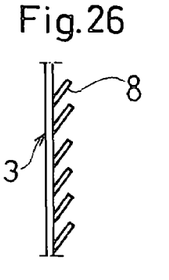
Figure 27:
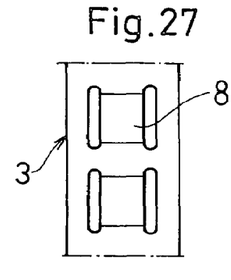
Figure 28:
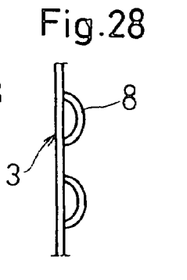
Figure 29:
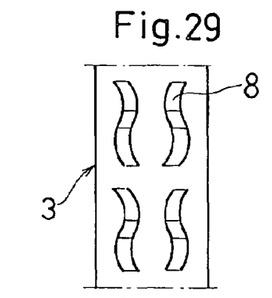
Figures 30, 31:
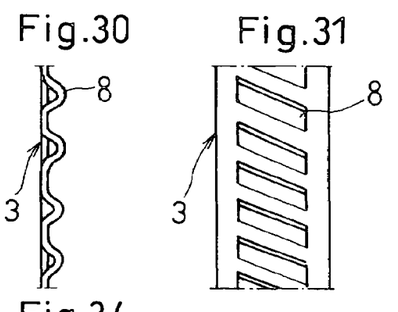
Figure 32:
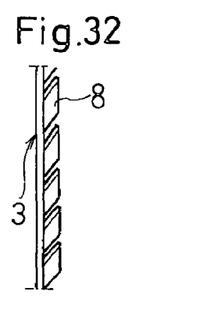
Figure 33:
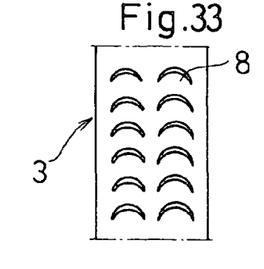
Figure 34:
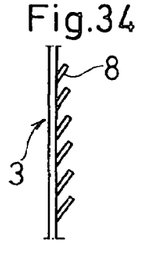

Examples of the segments represented herein are as shown in FIGS. 17-34. In FIGS. 17 and 18, arcuate kerfs are provided to form tongue-shaped segments 8 on the strap band 3. In FIGS. 19 and 20, the tongue-shaped segments 8 are tilted slantwise against the width direction of the strap band 3. In FIGS. 21 and 22, wavy kerfs are provided to form lip-shaped segments 8 on the strap band 3. In FIGS. 23 and 24, the lip-shaped segments 8 are tilted slantwise against the width direction of the strap band 3. In FIGS. 25 and 26, arcuates kerfs are provided at short regular intervals to form semicircular segments 8 on the strap band 3. In FIGS. 27 and 28, short kerfs are provided on both right and left sides of the strap band 3 to form semi-cylindrical segments 8. In FIGS. 29 and 30, S-shaped kerfs are provided on both right and left sides of the strap band 3 to form segments 8 meandering to the right and left. In FIGS. 31 and 32, linear kerfs are slantwisely provided to push out rectangular segments 8 from the strap band 3. In FIGS. 33 and 34, crescent-shaped kerfs are provided on both right and left sides in two rows to form semicircular segments 8 on the strap band 3. These segments 8 raised above are by way of example, the segments 8 are shaped as desired depending on the situation that the strap band 3 is placed.

Tenth Embodiment of the Invention

Figure 35:
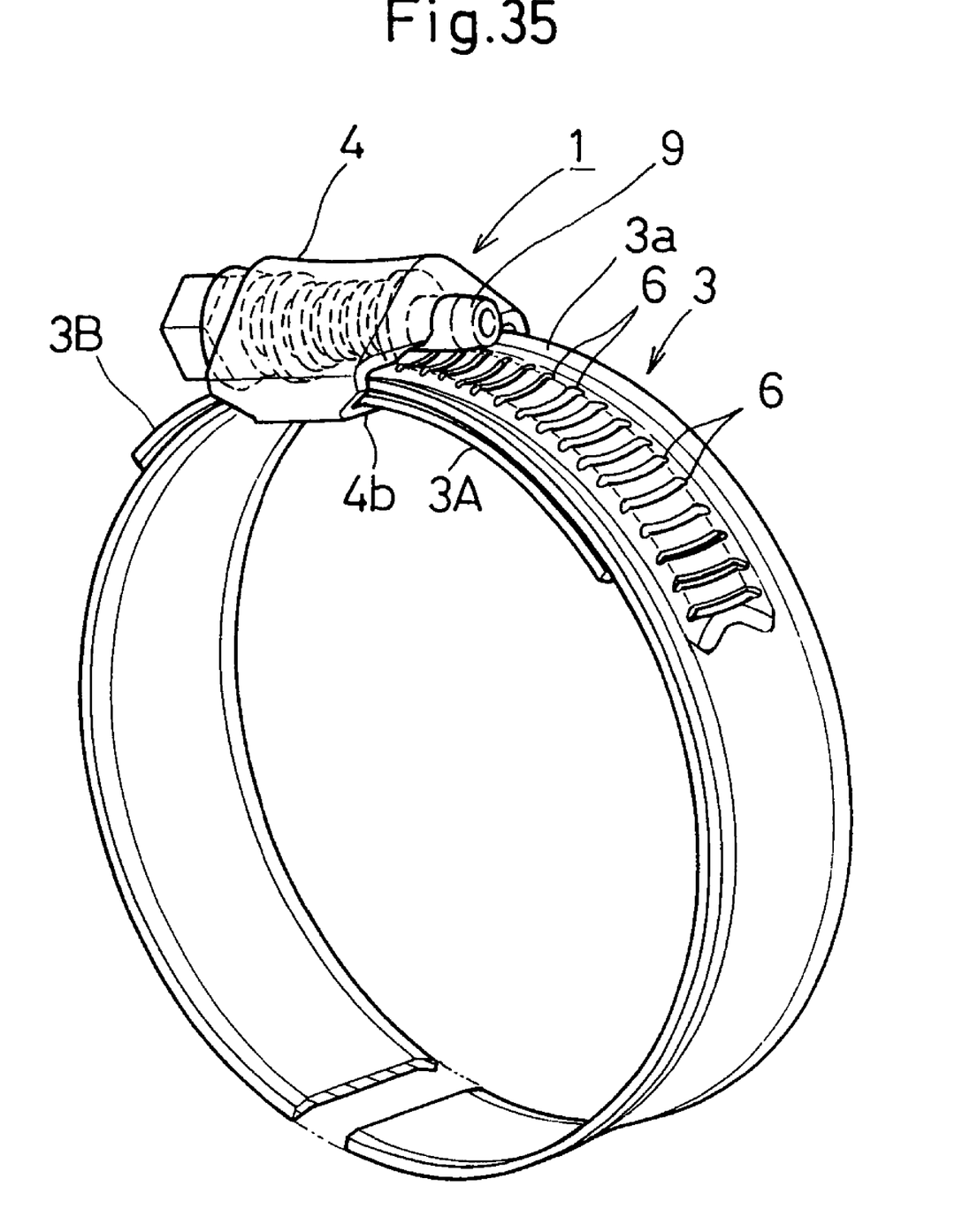
FIG. 35 is a perspective view of the clamping device according to a tenth embodiment of the invention.
Figure 36:
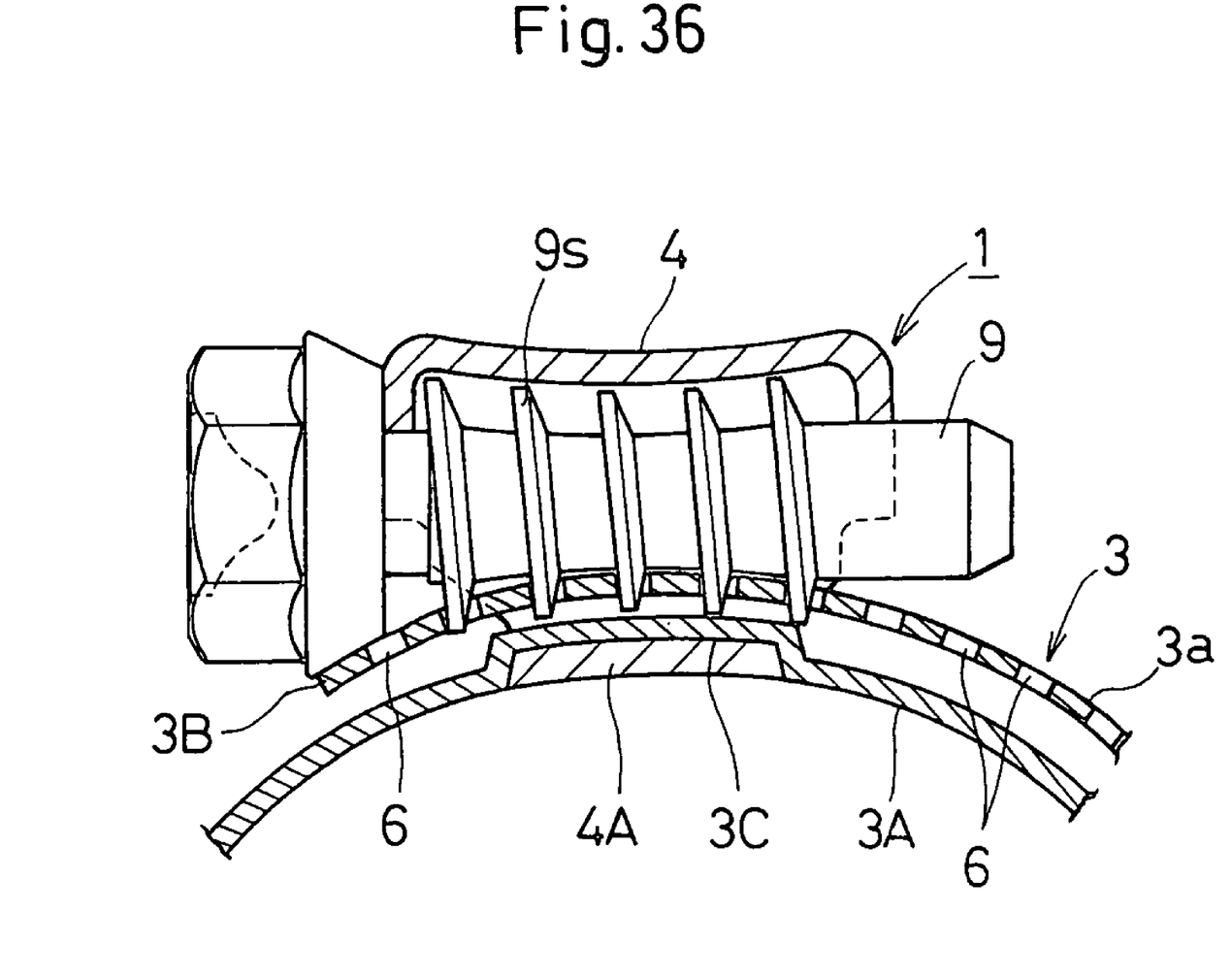
FIG. 36 is an enlarged longitudinal cross sectional view of the housing into which the worm screw is accommodated.

FIGS. 35 and 36 show a tenth embodiment of the invention in which the worm screw 9 has a screw pitch surface defined into a hyperboloidal configuration in correspondence to the arcuate portion 3a so as to increase a meshing area against the slit teeth portion 6. This makes it possible to align the screw pitch surface of the ridge portions 9s with the arcuate portion 3a of the strap band 3, thus increasing the meshing number of worm screw 9 against the slit teeth portion 6 as shown in FIG. 36.

With the screw pitch surface defined into a hyperboloidal configuration, it is possible to substantially spread the sliding pressure of the worm screw 9 against the slit teeth portion 6 to decrease the sliding pressure per a unit area. For this reason, it is possible to maintain the good meshing condition between the worm screw 9 and the slit teeth portion 6.

This is particularly advantageous when a diameter of the connecting portion 2 is relatively small because it is possible to remarkably increase the meshing number of worm screw 9 against the slit teeth portion 6 so as to render the above good meshing condition better between the worm screw 9 and the slit teeth portion 6.

Modification Forms (a) It is to be noted that reinforced synthetics, copper plate or alloyed metal may be used to the strap band 3 instead of the stainless steel (SUS304).

(b) Discrete tongue plates may be welded to the strap band 3 instead of the raised-up segments 8.

(c) Instead of the wavy and concavo-convex configuration, the arcuate portion 6 of the strap band 3 may be sharply formed into an M-shaped or W-shaped configuration as long as it increases the sliding and meshing area of the slit teeth portion 6 against the worm screw 5, 9.

(d) In order to smoothly operate the worm screw 5, 9 rotationally, lubricants (e.g., $MoS_2$, grease, polyfluoroethylene) may be applied between the worm screw 5, 9, and the slit teeth portion 6.

(e) At least either of the worm screw 5, 9 or the slit teeth portion 6 may be processed with a surface treatment such as a tin-plating, diamond-like carbon (DLC), salt bath (TD), ionized nitriding, TiC film or TiCN film.

INDUSTRIAL APPLICABILITY

In a clamping device for connection in which a worm screw is rotationally operated through an array of teeth portion to tighten a strap band, the array of teeth portion is formed into a wavy and concavo-convex configuration in the width direction, it is possible to increase a contact area or sliding pressure between the worm screw and the array of teeth portion. While at the same time, the array of teeth portion increases its bending rigidity to improve the physical strength in the direction in which the array of the teeth portion is subjected to the sliding pressure from the worm screw. This makes it possible to mesh the teeth portion of high bending rigidity with the worm screw through an enlarged contact area. It becomes possible to maintain a good meshing condition between the worm screw and the array of teeth portion upon tightly meshing the worm screw with the array of the teeth portion. In the case in which a larger amount of tightening force is required for the connecting portion, as connecting an intercooler (for cooling the compressed air) to an intake pipe in an internal combustion engine equipped with a supercharger or turbocharger, it is well-suited to a clamping device which requires a larger tightening force applied to the connecting portion and resultantly exhibits sufficient utility in the mechanical industry.

What is claimed is:

1. A clamping device for connection comprising:
a strap band formed into an open-end annular configuration so as to be tightly wound around a connecting portion to be connected;
a housing fixed to one end portion of said strap band in a circumferential direction of said strap band, and rotatably accommodating a worm screw;
an array of teeth portion arranged on the other end of said strap band so that said array of teeth portion comes to mesh with said worm screw within said housing, so as to tighten said strap band against said connecting portion by rotating said worm screw against said array of teeth portion;
said housing having an outer flat surface connected to another outer flat surface with a curved upper end as a roof portion, right and left sides of which has an arcuately recessed portion to form a slope surface portion as a reinforcement rib on a central portion of said outer flat surface; and
said other end portion of said strap band in which said array of teeth portion resides being formed into a wavy and concavo-convex configuration in a width direction of said strap band, so as to increase a meshing area of said array of teeth portion against said worm screw.

2. The clamping device for connection according to claim 1, wherein said strap band is made of an elastic material, and having a plurality of segments raised up intermittently in said circumferential direction, and each end of said segments being oriented opposite to a direction in which said strap band slides over said connecting portion upon tightening said strap band to make said strap band wind around said connecting portion.

3. The clamping device for connection according to claim 1, wherein said worm screw is formed by means of a rolling procedure, and said housing has an enveloping portion to surround said array of teeth portion, and said enveloping portion is ironed out to reduce a thickness thereof.

4. The clamping device for connection according to claim 1, wherein said array of teeth portion consists of narrow slits defined on said strap band.

5. The clamping device for connection according to claim 1, wherein said worm screw has a screw pitch surface defined into a hyperboloidal configuration so as to increase a meshing area against said array of teeth portion.

* * * * *